United States Patent
Lee et al.

(10) Patent No.: US 11,746,459 B2
(45) Date of Patent: Sep. 5, 2023

(54) WASHING MACHINE

(71) Applicant: LG ELECTRONICS INC., Seoul (KR)

(72) Inventors: Jeonguk Lee, Seoul (KR); Joonho Pyo, Seoul (KR); Taehee Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 17/352,595

(22) Filed: Jun. 21, 2021

(65) Prior Publication Data
US 2021/0310175 A1 Oct. 7, 2021

Related U.S. Application Data

(62) Division of application No. 16/521,891, filed on Jul. 25, 2019, now Pat. No. 11,085,141.

(30) Foreign Application Priority Data

Jul. 26, 2018 (KR) .......................... 10-2018-0087223

(51) Int. Cl.
*D06F 37/34* (2006.01)
*F16H 1/28* (2006.01)
(Continued)

(52) U.S. Cl.
CPC .............. *D06F 37/34* (2013.01); *D06F 37/06* (2013.01); *F16H 1/28* (2013.01); *D06F 21/00* (2013.01); *D06F 37/40* (2013.01)

(58) Field of Classification Search
CPC ................................................. D06F 37/30–40
See application file for complete search history.

(56) References Cited

U.S. PATENT DOCUMENTS

2013/0139557 A1 6/2013 Chen
2017/0292216 A1 10/2017 Goshgarian et al.

FOREIGN PATENT DOCUMENTS

EP       1 439 255      7/2004
JP    2015-205501     11/2015
(Continued)

OTHER PUBLICATIONS

European Search Report dated Nov. 19, 2019 issued in Application No. 19188595.3.
(Continued)

*Primary Examiner* — Spencer E. Bell
(74) *Attorney, Agent, or Firm* — KED & ASSOCIATES, LLP

(57) ABSTRACT

The present invention relates to a washing machine comprising an outer tub containing water, and an inner tub disposed in the outer tub to accommodate laundry and rotated about a horizontal axis. The washing machine includes: a motor for providing rotational force; an outer shaft that has a first hollow, and rotates the inner tub; an inner shaft disposed in the first hollow and rotated by the motor; a pulsator disposed in the inner tub and coupled with the inner shaft; a planetary gear train for transmitting rotational force of the motor; a carrier mover which has an outer circumferential surface that is spline-coupled to an inner circumferential surface of the outer shaft, and an inner circumferential surface that is screwed with an outer circumferential surface of the clutch carrier; and a stopper restricting movement of the carrier mover, thereby achieving various washing modes with a simple mechanism by rotating the inner tub and the pulsator.

8 Claims, 10 Drawing Sheets

(51) Int. Cl.
*D06F 21/00* (2006.01)
*D06F 37/40* (2006.01)
*D06F 37/06* (2006.01)

(56) References Cited

FOREIGN PATENT DOCUMENTS

| | | |
|---|---|---|
| JP | 2016-205501 | 12/2016 |
| KR | 10-1995-0006113 | 3/1995 |
| KR | 10-2018-0077639 | 7/2018 |
| WO | WO 2015/131482 | 9/2015 |

OTHER PUBLICATIONS

Korean Notice of Allowance dated Oct. 16, 2019 issued in Application No. 10-2018-0087223.

WASHING MACHINE

CROSS-REFERENCE TO RELATED APPLICATION

This application is a Divisional application of prior U.S. patent application Ser. No. 16/521,891 filed Jul. 25, 2019, which claims priority under 35 U.S.C. § 119 to Korean Application No. 10-2018-0087223 filed on Jul. 26, 2018, whose entire disclosure is hereby incorporated by reference.

BACKGROUND

1. Field

The present invention relates to a washing machine having a clutch system for connecting or disconnecting a washing shaft and a dewatering shaft.

2. Background

A front loading type washing machine is generally provided with an inner tub for accommodating laundry so as to be rotatable about a horizontal axis, in an outer tub provided in a casing. In such a washing machine, the laundry is lifted and then dropped as the inner tub is rotated, thereby doing the wash. However, in such a scheme, since the washing is performed by using the impact force due to the falling of the laundry, there is a problem that it is difficult to induce friction (i.e., scrubbing) between laundries, or twisting (i.e., wringing) of laundry.

In order to solve such a problem, Japanese Patent Laid-Open Publication No. 2015-205501 discloses a structure in which a stirring body is provided in a drum (inner tub), and the rotation of a first rotation shaft for rotating the stirring body is reduced through a planetary gear mechanism (deceleration mechanism) and transmitted to a second rotation shaft for rotating the drum.

Japanese Patent Laid-Open Publication No. 2015-205501 can improve washing power by rotating the stirring body and the drum at different speeds. However, since the stirring body and the drum should rotate together during a dewatering process, a clutch mechanism portion for clutching the first rotation shaft and the second rotation shaft is provided.

However, since the clutch mechanism portion is composed of various components such as a clutch body, a clutch spring, a clutch lever, a lever support portion, a clutch driving device, a mounting plate, etc., the configuration is complicated. In addition, the space occupied by these parts is an obstacle to expanding the capacity of the drum.

The above reference is incorporated by reference herein where appropriate for appropriate teachings of additional or alternative details, features and/or technical background.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Figure 1:
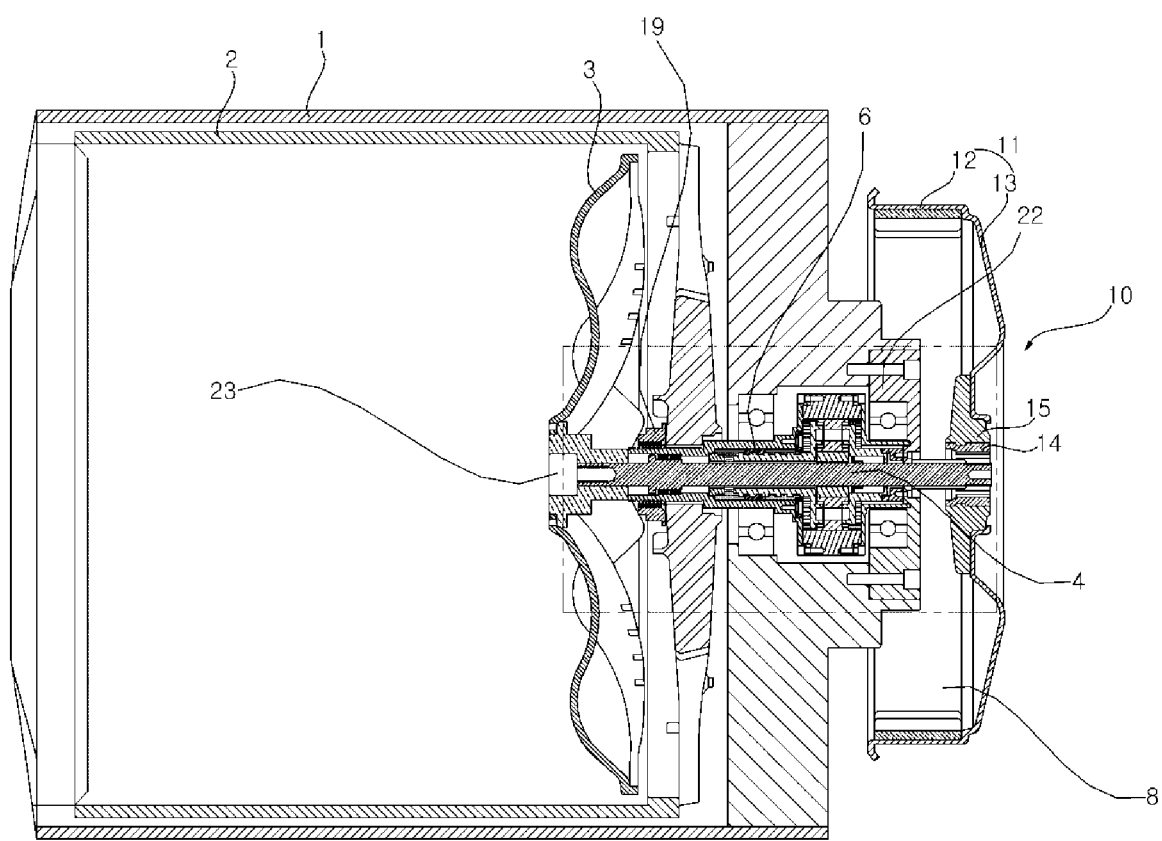
FIG. 1 is a longitudinal sectional view of a washing machine according to an embodiment of the present invention.

The present invention has been made in view of the above problems, and provides a washing machine having a simplified clutching system for clutching a shaft for rotating the inner tub and a shaft for rotating the pulsator during dewatering, in a structure in which a pulsator is applied to a front loading type washing machine in which the inner tub is rotated about a horizontal axis and the pulsator and the inner tub are rotated using a planetary gear train.

The present invention further provides a washing machine in which the clutch system is operated by a motor that rotates the pulsator, not by a separate driving source. That is, there is provided a washing machine for controlling the clutch system through rotation control of the motor, without requiring separate control means for controlling the clutch system.

The present invention further provides a washing machine in which the number of parts of the clutch system is reduced, and a separate motor used in the operation of the clutch system of the related art and its associated components are eliminated.

The present invention further provides a washing machine for rotating the pulsator and the inner tub in opposite directions.

A washing machine of the present invention includes: a pulsator in an inner tub rotated about a horizontal axis. The inner shaft coupled with the pulsator is rotated by the motor, and the rotation of the inner tub is transmitted to the outer shaft that rotates the inner tub by the planetary gear train. The outer shaft and the inner shaft form a double shaft structure having concentricity. A first hollow is formed in the outer shaft, and the inner shaft is disposed in the first hollow.

The planetary gear train includes a ring gear fixed to the outer shaft; a sun gear connected to the inner shaft inside the ring gear; a plurality of pinion gears which are engaged with the sun gear and inscribed in the ring gear, and allowed to move in a direction parallel to the inner shaft; and a clutch carrier which rotatably supports each of the plurality of pinion gears, and are moved together with the plurality of pinion gears when the plurality of pinion gears are moved in the direction parallel to the inner shaft. The clutch carrier is disposed in the first hollow and has a cylindrical shape having a second hollow through which the inner shaft passes.

The washing machine further includes a carrier mover which is formed in a cylindrical shape, and has an outer circumferential surface that is spline-coupled to an inner circumferential surface of the outer shaft defining the first hollow, and an inner circumferential surface that is screwed with an outer circumferential surface of the clutch carrier.

The carrier mover is moved in a first direction when being rotated in a normal direction with respect to the clutch carrier, and is moved in a second direction opposite to the first direction when being rotated in a reverse rotation direction with respect to the clutch carrier.

The washing machine further includes a a first stopper restricting movement of the carrier mover in the first direction, and a second stopper for restricting movement of the carrier mover in the second direction.

The washing machine further includes a third stopper connected to the outer tub and restricting movement of the clutch carrier in the second direction.

The clutch carrier is moved in the first direction by rotation in the reverse rotation direction with respect to the carrier mover and separated from the third stopper, and further movement of the clutch carrier is restricted when reaching a preset shaft coupling position in the first direction.

The washing machine further includes a fourth stopper for restricting movement of the clutch carrier in the first direction, in a state where the clutch carrier reaches the shaft coupling position. However, it is not limited thereto, and the movement of the clutch carrier in the first direction may be restricted by the first stopper, in the state where the clutch carrier reaches the shaft coupling position.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 2:
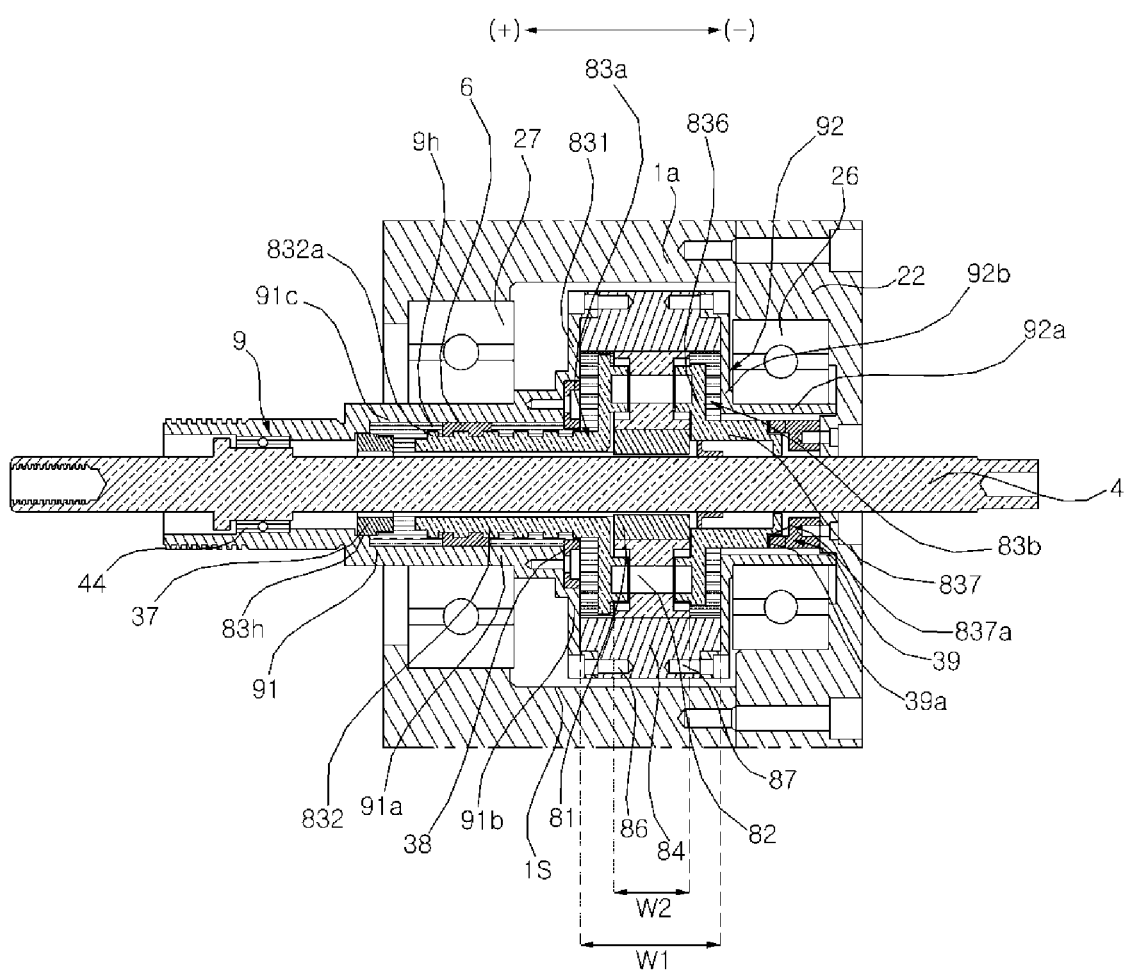
FIG. 2 is a partial enlarged view of FIG. 1.

FIG. 1 is a longitudinal sectional view of a washing machine according to an embodiment of the present invention. FIG. 2 is a partial enlarged view of FIG. 1. Referring to FIGS. 1 and 2, the washing machine according to an embodiment of the present invention includes an outer tub 1 in which water is contained, an inner tub 2 disposed in the outer tub 1 to accommodate laundry, and rotated around a horizontal axis O, a pulsator 3 disposed in the inner tub 2, and a motor 10 providing rotational force. A plurality of through holes (not shown) may be formed in the inner tub 2 so that water can be exchanged between the outer tub 1 and the inner tub 2. The horizontal axis O does not have to be strictly horizontal, but may be inclined at a certain angle with respect to the horizontal. However, even in this case, it is more nearly horizontal than vertical.

The front side (left side in FIG. 1) of the inner tub 2 is opened, and the rear side is closed. The pulsator 1 is disposed in the rear portion of the inner tub 2, and is provided rotatable around the horizontal axis. A lifter (not shown) may be protruded from the inner circumferential surface of the inner tub 2, and the laundry is lifted up by the lifter when the inner tub 2 is rotated.

Although not shown, a water supply portion (e.g., a water supply valve) for supplying water to the outer tub 1 or the inner tub 2 may be provided, and a drain portion for draining the outer tub 1 (e.g., drain valve, drain pump) may be further provided.

The outer tub 1 is disposed in a casing (not shown) constituting the outer shape of the washing machine. The front side of the outer tub 1 is opened and the rear is closed. A suspension (not shown) or a damper (not shown) for buffering the vibration of the outer tub 1 caused by the rotation of the inner tub 2 may be provided in the bottom of the casing.

The motor 10 is capable of performing normal/reverse rotation, and the pulsator 3 and the inner tub 2 are rotated by the motor 10. The motor 10 is capable of controlling the rotation direction and the rotation speed. The motor 10 is preferably a brushless direct current electric motor (BLDC), but it is not necessarily limited thereto.

The motor 10 is implemented by an outer rotor type in which a stator (not shown) having a wound induction coil is disposed in a center portion and a rotor 11 is rotated around the stator. The rotor 11 may include a bottom portion 13 and a ring-shaped side surface portion 12 extending upward from the bottom portion 13. The inner shaft 4 for rotating the pulsator 3 may be connected to a rotor hub 15 fixed to the bottom portion 13 by a rotor bush 14. A plurality of magnets (not shown) are provided along the circumferential direction in the inner circumferential surface of the side surface portion 12 of the motor 10 so that the rotor 11 is rotated by a magnetic field acting between the stator and the magnet.

A planetary gear train 8 for transmitting the rotational force of the motor 10 is further provided. The planetary gear train 8 may be disposed in a first hollow 9h. The planetary gear train 8 may receive the rotational force of the motor 10 through the inner shaft 4, and convert an output with a preset speed ratio or torque ratio to rotate an outer shaft 9. The planetary gear train 8 will be described later in more detail.

The inner shaft 4 is coupled with the pulsator 3. A fastening hole is formed in the center of the pulsator 3, and a screw 23 that passes through the fastening hole from above may be fastened to the inner shaft 4.

The outer shaft 9 is connected to the inner tub 2 and has a cylindrical shape in which the first hollow 9h through which the inner shaft 4 passes is formed. In the first hollow 9h, the inner diameter portion may support the outer circumferential surface of the inner shaft 4, and the outer diameter portion may be provided with a bearing 44 that supports the inner circumferential surface of the outer shaft 9.

The outer shaft 9 includes a front outer shaft 91 and a rear outer shaft 92. A ring gear 84 constituting the planetary gear train 8 may be provided in a space defined by the front outer shaft 91 and the rear outer shaft 92. The front outer shaft 91 may include a portion 91a extending forward based on the ring gear 84. The rear outer shaft 92 may include a portion 92a extending rearward based on the ring gear 84.

In the embodiment, the front outer shaft 91 and the rear outer shaft 92 are made of different components, but are integrally rotated by being connected by the ring gear 84. However, it is not necessarily limited thereto. According to the embodiment, the front outer shaft 91 and the rear outer shaft 92 can be made of a single component, and a space in which the ring gear 84 is fixed to the inside thereof can be provided.

A bearing 27 for supporting the portion 91a protruded to the front side of the front outer shaft 91 may be disposed in the outer tub 1. The bearing 27 is a two-way bearing that supports the outer shaft 9 to rotate in any direction among the normal (e.g., CW) direction, and the reverse (e.g., CCW) direction.

The outer tub 1 may be provided with a space 1s, in which the planetary gear train 8 is accommodated, formed in a rear wall 1a disposed in the rear side of the inner tub 2. The rear wall 1a may be provided with a front opening formed in the front surface, and a rear opening formed in the rear surface, and the front opening and the rear opening may communicate with each other by the space 1s. That is, the space 1s has a cylindrical shape connecting the front opening and the rear opening, a portion 91a protruded to the front side of the front outer shaft 91 passes through the front opening and is coupled with a hub base 18 described later, and a portion 92a protruded to the rear side of the outer shaft 9 passes through the rear opening and protrudes rearward.

The outer tub 1 may include a cover 22 covering the rear opening. The cover 22 is coupled with the rear wall 1s and the cover 22 is formed with a through hole through which the inner shaft 4 passes. A bearing 26 supporting the rear outer shaft 92 to be rotatable in any direction among the normal and reverse directions may be disposed in the cover 22.

A hub base 18 coupled to the bottom of the inner tub 2 may be provided in the rear side of the inner tub 2. An opening is formed in the center of the rear wall of the inner tub 2. In the hub base 18, a fastening members such as screw or bolt may pass through the portions contacting the circumference of the opening and be fastened to the rear wall of the inner tub 2.

The hub base 18 is rotated together when the outer shaft 9 is rotated. The outer shaft 9 and the hub base 18 are engaged (or meshed) with each other. The outer shaft 9 and the hub base 18 may be spline-coupled. On the outer surface of the outer shaft 9, teeth constituting a spline may be formed. The hub base 18 is formed in a disc shape as a whole, and a boss through which the outer shaft 9 passes may be formed in the center portion. A coupling groove for engaging with the teeth may be formed in the inner circumferential surface of the boss. The front outer shaft 91 of the outer shaft 9 may be protruded forward after passing through the boss of the hub base 18, and such a protruded portion may be fastened to a nut 19.

The planetary gear train 8 includes a sun gear 81, a pinion gear 82, a clutch carrier 83, and a ring gear 84. The sun gear 81 is connected to the inner shaft 4 and may be moved along the inner shaft 4 while being rotated integrally with the inner shaft 4. The sun gear 81 may be spline-coupled to the inner shaft 4. Here, the spline coupling means that a spline such as a tooth or a key extending in the axial direction is formed in one of the sun gear 81 and the inner shaft 4 and a groove engaged with the spline is formed in the other, so that the sun gear 81 rotates together when the inner shaft 4 is rotated due to the engagement between the spline and the groove, while permitting the axial movement of the sun gear 81 with respect to the inner shaft 4 due to the movement of the spline along the groove.

The ring gear 84 is fixed to the outer shaft 9. That is, the ring gear 84 rotates integrally with the outer shaft 9. The front outer shaft 91 may include a front flange 91b extending radially outward from the rear end of the forwardly protruded portion 91a. The rear outer shaft 92 may include a rear flange 92b extending radially outward from the front end of the rearwardly protruded portion 92a. The ring gear 84 is disposed between the front flange 91b and the rear flange 92b, and a first fastening member 86 and a second fastening member 87 pass through the front flange 91b and the rear flange 92b, 92b respectively and are fastened to the ring gear 84.

The ring gear 84 is formed with teeth on the inner circumferential surface defining the ring-shaped opening. The pinion gear 82 is interposed between the sun gear 81 and the ring gear 84, and engaged with the sun gear 81 and the ring gear 84. A plurality of pinion gears 82(2), 82(3), 82(4) may be disposed along the circumference of the sun gear 81, and each of the pinion gear 82 is rotatably supported by the clutch carrier 83.

Each of the pinion gears 82 is movable in the axial direction while engaged with the ring gear 84. That is, when the face width W1 of the ring gear 84 is longer than the face width W2 of the pinion gear 82 and the pinion gear 82 moves together with the clutch carrier 83 along the inner shaft 4, the pinion gear 82 can be moved in the axial direction in the state of being engaged with the ring gear 84.

The clutch carrier 83 is disposed in the first hollow 9h of the outer shaft 9, and has a cylindrical shape provided with a second hollow 83h through which the inner shaft 4 passes. The carrier mover 6 is screwed into the clutch carrier 83. Specifically, the carrier mover 6 has a cylindrical shape. The outer circumferential surface of the carrier mover 6 is spline-coupled to the inner circumferential surface of the outer shaft 9 defining the first hollow 9h, and the inner circumferential surface thereof is screwed to the outer circumferential surface of the clutch carrier 83. The clutch carrier 83 has an external thread 832a formed on the outer circumferential surface of a cylindrical clutch portion 832 in which the second hollow 83h is formed, and an internal thread 91c, which is formed on the inner circumferential surface of the carrier mover 6, that is engaged with the external thread 832a.

The carrier mover 6 is moved in the first direction (+) when being rotated in the normal rotation direction CW with respect to the clutch carrier 83, and is moved in the second direction (−) opposite to the first direction (+) when being rotated in the reverse rotation direction CCW with respect to the clutch carrier 83.

The clutch carrier 83 may include a clutch carrier front portion 83a and a clutch carrier rear portion 83b. The clutch carrier front portion 83a and the clutch carrier rear portion 83b are spaced apart from each other in the front-rear direction, and at least one pinion gear 82 is provided between the clutch carrier front portion 83a and the clutch carrier rear portion 83b.

The clutch carrier front portion 83a includes a first mounting plate 831 having a first through hole through which the inner shaft 4 passes and to which one end of the rotational shaft of the pinion gear 82 is connected, and a cylindrical portion lengthily extending forwardly around the circumference of the first through hole, and a clutch portion 832 may be formed by the cylindrical portion.

The clutch carrier rear portion 83b may include a second mounting plate 836 having a second through hole through which the inner shaft 4 passes and to which the other end of the rotational shaft of the pinion gear 82 is connected, and a connecting portion 837 lengthily extending rearward around the circumference of the second through hole, and engaged with a third stopper 39 described later when the clutch carrier 83 is maximally moved in the second direction (−).

The carrier mover 6 is moved in the axial direction while being relatively rotated with respect to the clutch carrier 83. Specifically, the carrier mover 6 is moved in the first direction (+) when being rotated in the normal rotation direction CW with respect to the clutch carrier 83, and is moved in the second direction (−) opposite to the first direction (+) when being rotated in the reverse rotation direction CCW with respect to the clutch carrier 83.

A first stopper 37 for restricting the movement of the carrier mover 6 in the first direction (+) is provided. When the inner shaft 4 is rotated in the reverse rotation direction CCW and the outer shaft 9 is rotated in the normal rotation direction CW together with the ring gear 84 in the state where the rotation of the clutch carrier 83 is restricted, the carrier mover 6 is rotated together with the outer shaft 9 in the normal rotation direction CW. At this time, the carrier mover 6 is moved in the first direction (+) while being rotated in the normal rotation direction CW with respect to the clutch carrier 83. The movement of the carrier mover 6 in the first direction (+) is restricted by the interference with the first stopper 37. The first stopper 37 is positioned in the first direction (+) with respect to the carrier mover 6, and is preferably fixed in the first hollow 9h.

A second stopper 38 for restricting movement of the carrier mover 6 in the second direction (−) is provided. When the inner shaft 4 is rotated in the normal rotation direction CW and the outer shaft 9 is rotated in the reverse rotation direction CCW together with the ring gear 84 in the state where the rotation of the clutch carrier 83 is restricted, the carrier mover 6 is rotated together with the outer shaft 9 in the reverse rotation direction CCW. At this time, the carrier mover 6 is moved in the second direction (−) while being rotated in the reverse rotation direction CCW with respect to the clutch carrier 83. The movement of the carrier mover 6 in the second direction (−) is restricted by the interference with the second stopper 38. The second stopper 38 is positioned in the second direction (−) with respect to the carrier mover 6, and is preferably fixed in the first hollow 9h.

When the clutch carrier 83 is rotated in the reverse rotation direction CCW, in the state where the movement of the carrier mover 6 is restricted and the rotation of the clutch carrier 83 is permitted, the clutch carrier 83 is rotated in the second direction (−). A third stopper 39 for restricting the movement of the clutch carrier 83 in the second direction (−) is provided. The third stopper 39 is connected to the outer tub 1. In other words, the third stopper 39 may be a non-rotating member whose position with respect to the outer tub 1 is fixed.

The connecting portion 837 of the clutch carrier 83 may be engaged with the third stopper 39 so that the rotation can be restricted. For example, when a protrusion 39a is formed in one of the connecting portion 837 and the third stopper 39, and a groove 837a is formed in the other of the connecting portion 837 and the third stopper 39 so as to be engaged with the protrusion 39a, the rotation of the clutch carrier 83 may be restrained in the state where the protrusion and the groove are engaged with each other. Preferably, the normal direction rotation (CW) of the clutch carrier 83 as well as the reverse direction rotation (CCW) are restrained (restricted).

Figure 3:
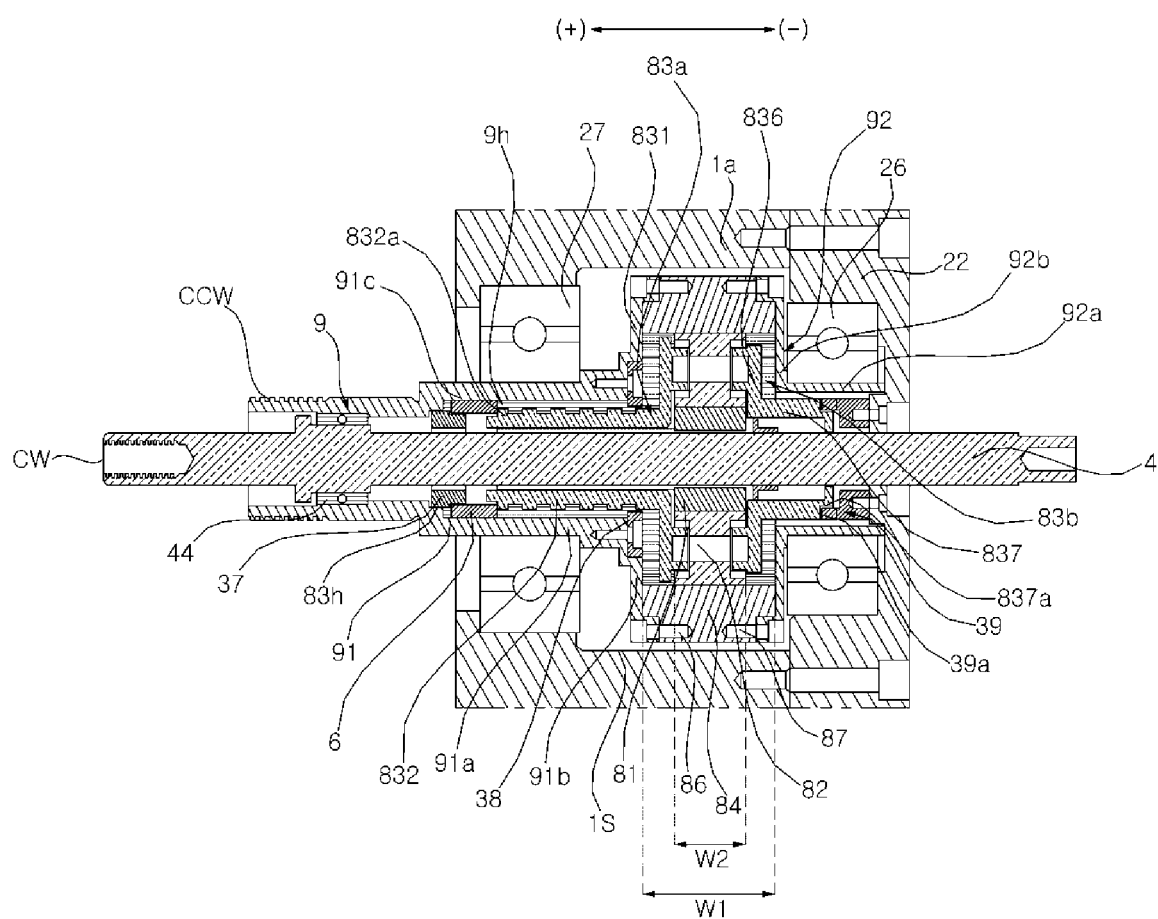
FIG. 3 shows a state in which a clutch carrier is rotationally restrained, and a carrier mover reaches a maximally moved position in a first direction (+)
Figure 4:
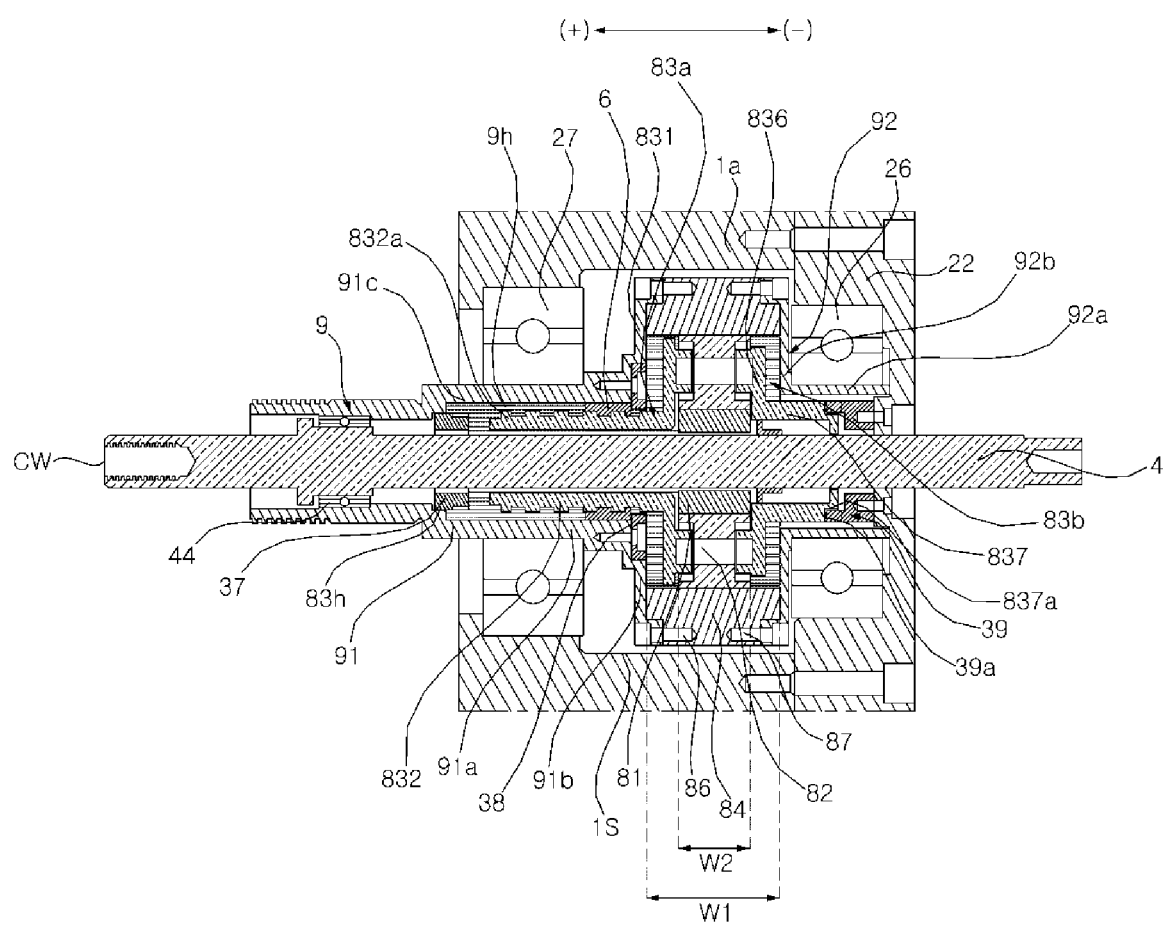
FIG. 4 shows a state in which a motor is rotated in a normal rotation direction in the state of FIG. 3, and a carrier mover is moved in a second direction (−)
Figure 5:
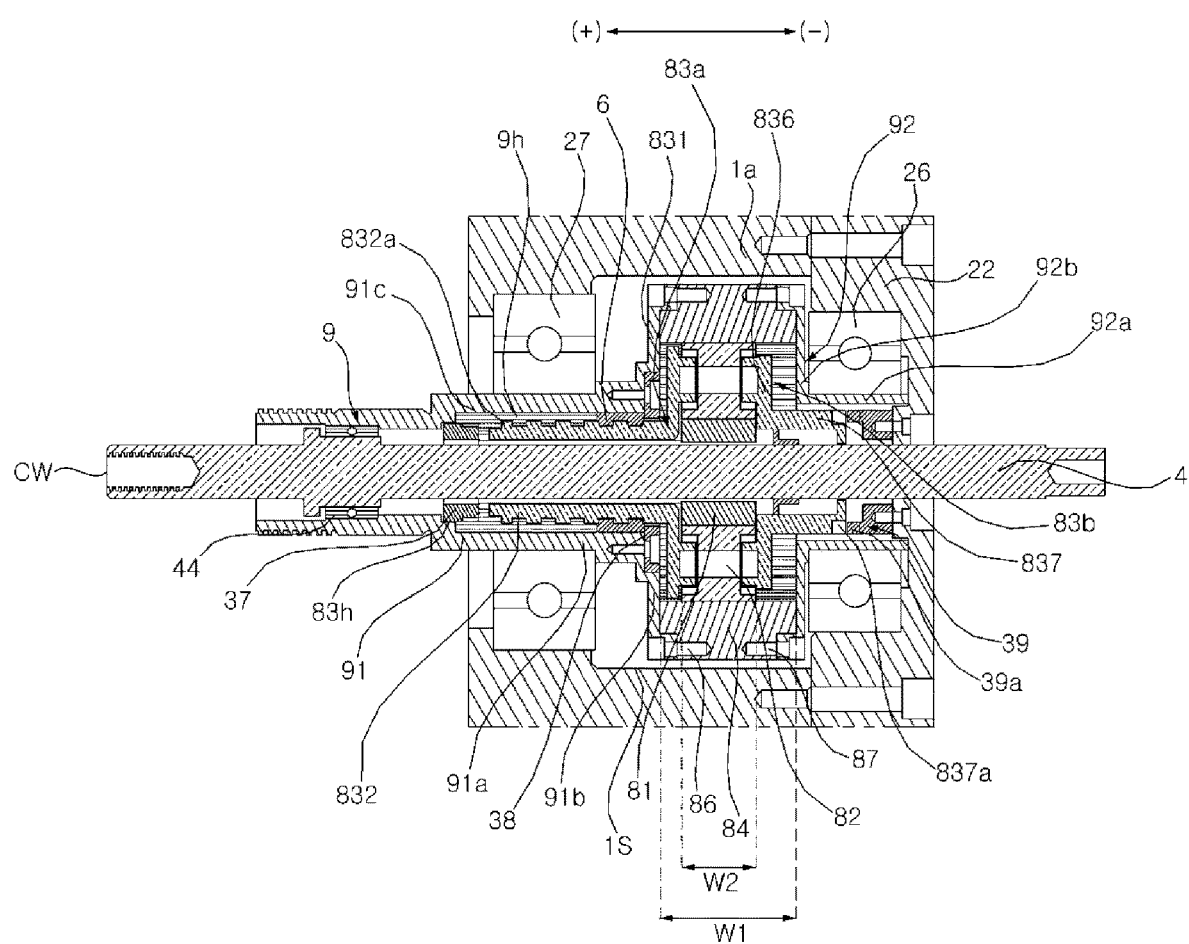
FIG. 5 shows a state in which a motor is further rotated in a normal rotation direction in the state of FIG. 4, and a clutch carrier is moved in a first direction (+)
Figure 6:
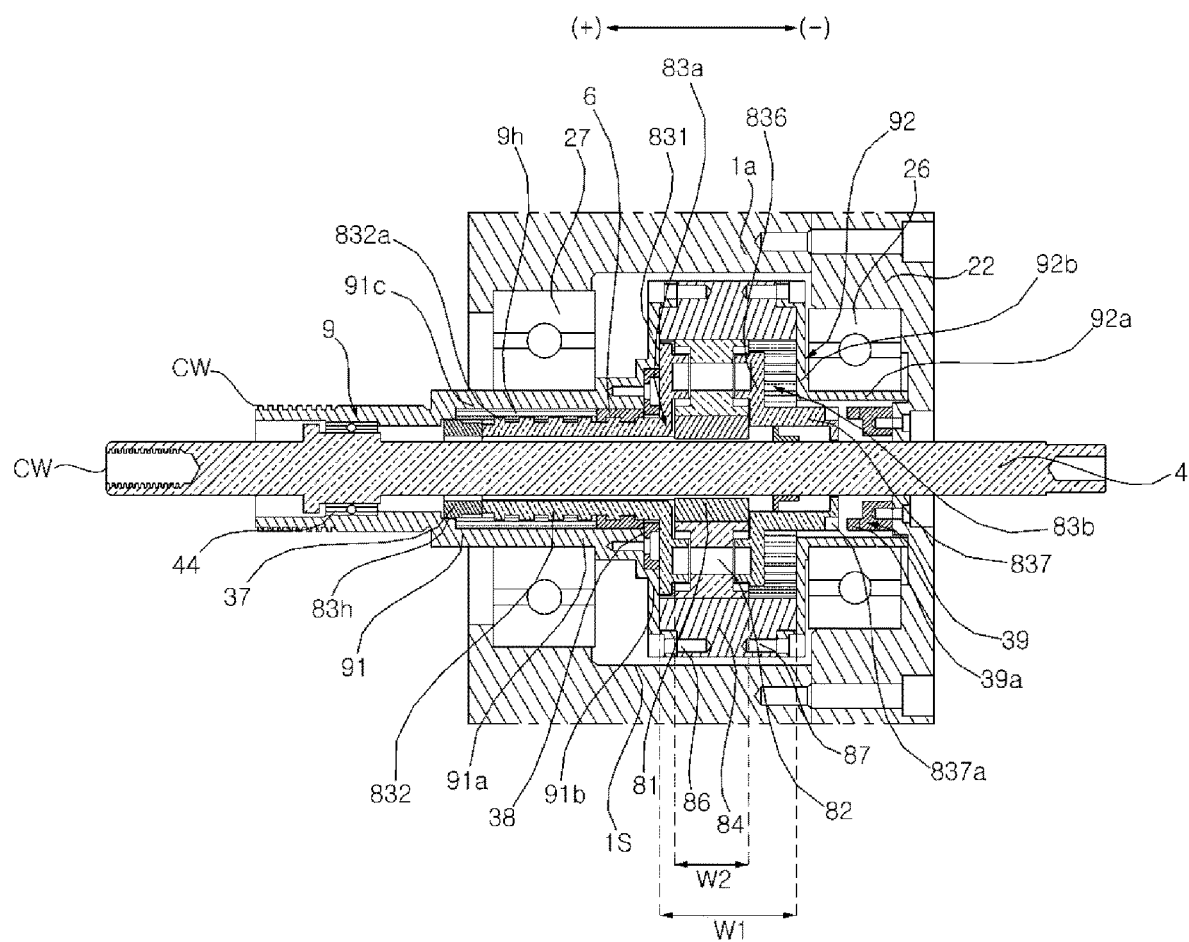
FIG. 6 shows a state in which a motor is further rotated in a normal rotation direction in the state of FIG. 5, and a clutch carrier is maximally moved in a first direction (+)
Figure 7:
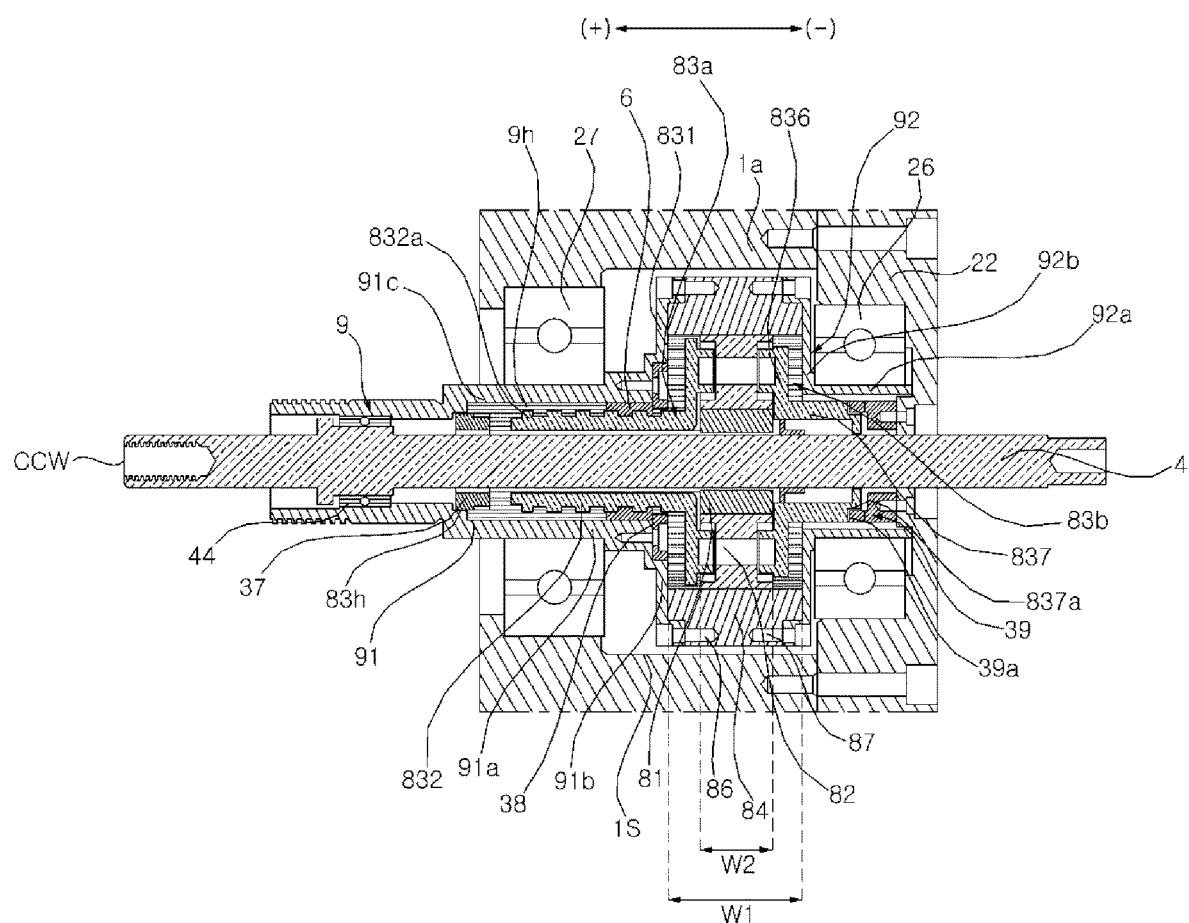
FIG. 7 shows a state in which a motor is rotated in a reverse rotation direction in the state of FIG. 6, and a clutch carrier is maximally moved in a second direction (−)
Figure 8:
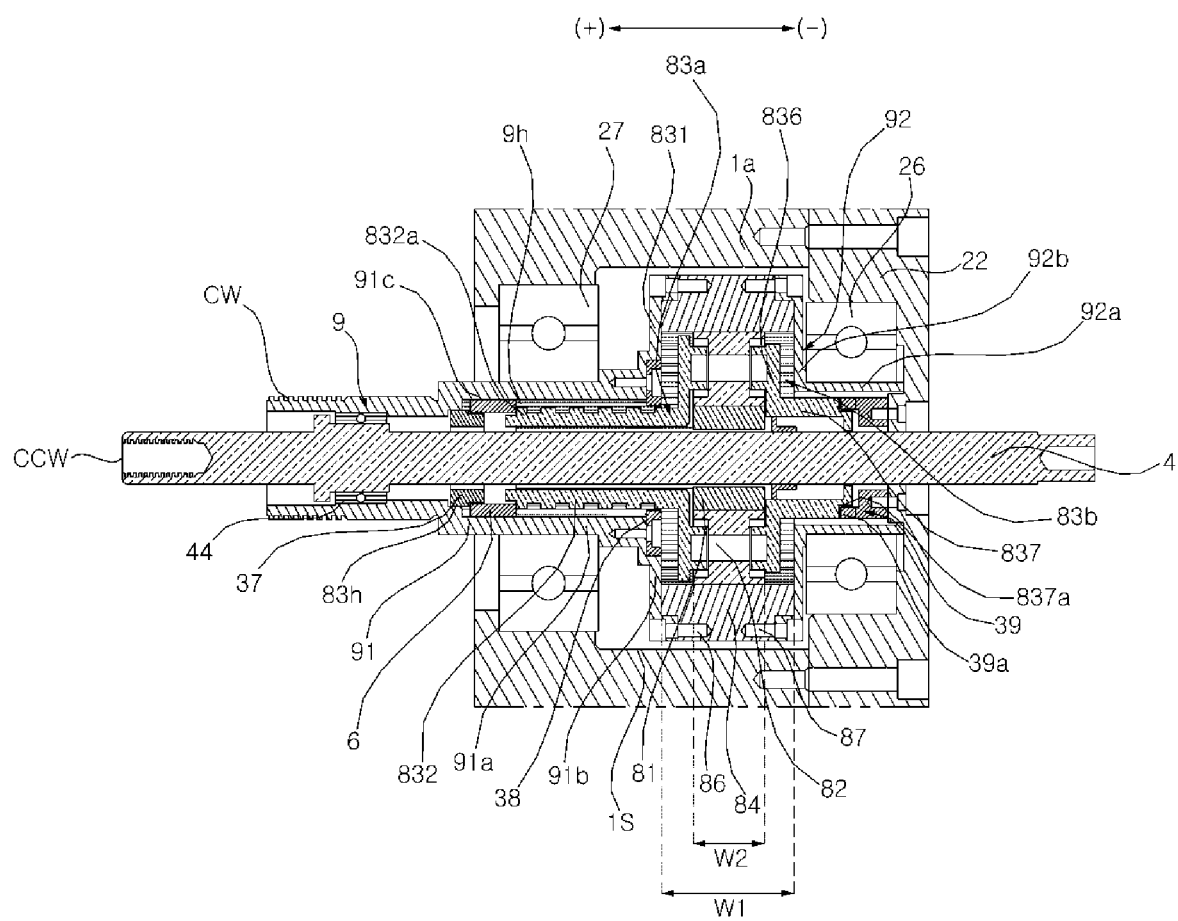
FIG. 8 shows a state in which a motor is further rotated in a reverse rotation direction in the state of FIG. 7, and a carrier mover is moved in a first direction (+)
Figure 9A:
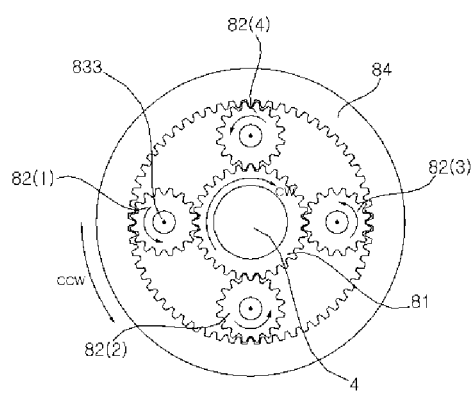
FIG. 9A schematically shows the operation of a planetary gear train when a motor is rotated in a normal rotation direction in a state where the rotation of the carrier is restrained.
Figure 9B:
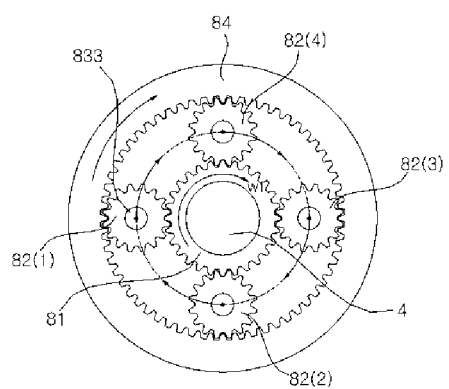
FIG. 9B schematically shows the operation of the planetary gear train in a state where an inner shaft and an outer shaft are connected.
Figure 10:
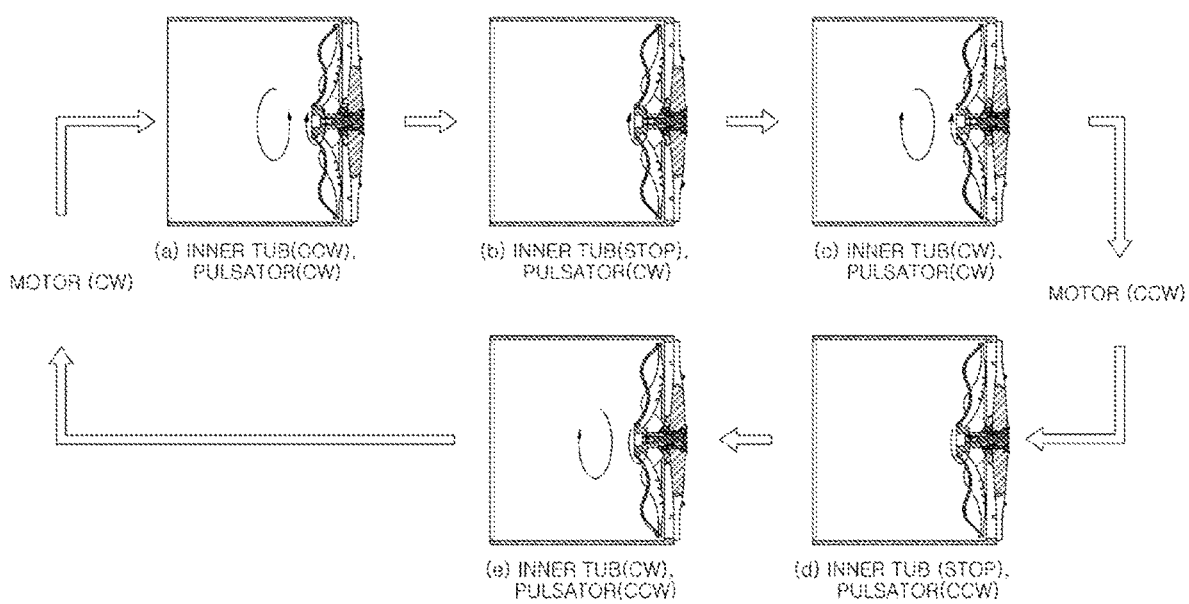
FIG. 10 sequentially shows the rotating state of a drum and a pulsator according to the rotation control of a motor.

FIG. 3 shows a state in which a clutch carrier is rotationally restrained, and a carrier mover reaches a maximally moved position in a first direction (+). FIG. 4 shows a state in which a motor is rotated in a normal rotation direction in the state of FIG. 3, and a carrier mover is moved in a second direction (−). FIG. 5 shows a state in which a motor is further rotated in a normal rotation direction in the state of FIG. 4, and a clutch carrier is moved in a first direction (+). FIG. 6 shows a state in which a motor is further rotated in a normal rotation direction in the state of FIG. 5, and a clutch carrier is maximally moved in a first direction (+). FIG. 7 shows a state in which a motor is rotated in a reverse rotation direction in the state of FIG. 6, and a clutch carrier is maximally moved in a second direction (−). FIG. 8 shows a state in which a motor is further rotated in a reverse rotation direction in the state of FIG. 7, and a carrier mover is moved in a first direction (+). FIG. 9A schematically shows the operation of a planetary gear train when a motor is rotated in a normal rotation direction in a state where the rotation of the carrier is restrained, and FIG. 9B schematically shows the operation of the planetary gear train in a state where an inner shaft and an outer shaft are connected. FIG. 10 sequentially shows the rotating state of a drum and a pulsator according to the rotation control of a motor. Hereinafter, the operation of the washing machine will be described with reference to FIG. 3 to FIG. 10.

Referring to FIG. 3, in the state where the clutch carrier 83 is rotation-restrained by the third stopper 39 and the carrier mover 6 is moved maximally in the first direction (+) (i.e., the state where the movement of the carrier mover 6 in the first direction (+) is restricted by the first stopper 37), when the inner shaft 4 is rotated in the normal rotation direction CW, the ring gear 84 is rotated in the reverse rotation direction CCW, so that the carrier mover 6 is also rotated in the reverse rotation direction CCW and moved in the second direction (−). At this time, the pulsator 3 is rotated in the normal rotation direction CW and the inner tub 2 is rotated in the reverse rotation direction CCW. (see FIG. 10A). That is, the pulsator 3 and the inner tub 2 are rotated in opposite directions, and such an operation is performed until the movement of the carrier mover 6 is restricted by the second stopper 38.

FIG. 4 shows a state in which the carrier mover 6 can be no longer moved in the second direction (−) by the second stopper 38. The displacement of the carrier mover 6 in the second direction (−) becomes maximum, and the pulsator 3 is continuously rotated in the normal rotation direction CW, but the inner tub 2 is stopped (see FIG. 10B).

In FIG. 4, when the inner shaft 4 continuously rotates in the normal rotation direction CW, the clutch carrier 83 is relatively rotated with respect to the carrier mover 6 in the reverse rotation direction CCW. Thus, the clutch carrier 83 is separated from the third stopper 39 while being moved in the first direction (+) (see FIG. 5).

When the inner shaft 4 is rotated in the normal rotation direction CW continuously after the clutch carrier 83 is disengaged from the third stopper 39, the clutch carrier 83 continues to move in the first direction (+), and further movement is restricted when reaching a preset shaft coupling position (see FIG. 6). In the embodiment, the clutch carrier 83 is restrained by the first stopper 37 from moving in the first direction (+), in a state where the clutch carrier 83 reaches the shaft coupling position. However, the present invention is not limited thereto, and a fourth stopper may be provided separately from the first stopper 37. The clutch carrier 83 may be restrained from moving in the first direction (+) by the fourth stopper when reaching the shaft coupling position. When the inner shaft 4 continues to rotate in the normal rotation direction CW in the state of FIG. 6, the clutch carrier 83 can no longer be moved in the first direction (+). Therefore, in this case, the sun gear 81, the clutch carrier 83, and the ring gear 84 are integrally rotated in the normal rotation direction CW, so that both of the pulsator 3 and the inner tub 2 rotate in the normal rotation direction CW. (see FIG. 10C).

When the inner shaft 4 is rotated in the reverse rotation direction CCW in the state of FIG. 6, the load acting on the outer shaft 9 from the inner tub 2 is relatively larger than the load acting on the inner shaft 4 from the pulsator 3. Therefore, in the state where the carrier mover 6 is substantially rotation-restrained, the clutch carrier 83 is moved in the second direction (−) while being rotated in the reverse rotation direction CCW so that it is separated from the first stopper 37 (or a separate fourth stopper according to the embodiment). The pulsator 3 is rotated in the reverse rotation direction CCW in the state where the inner tub 2 is stopped (see FIG. 10D). When the clutch carrier 83 is moved in the second direction (−) and interferes with the third stopper 39 while continuously relatively rotating with respect to the carrier mover 6, the rotation of the clutch carrier 83 is finally restrained (see FIG. 7).

As shown in FIG. 8, the rotation of the clutch carrier 83 is restrained by the third stopper 39 in the state in which the clutch carrier 83 is restrained from moving by the third stopper 39. Therefore, when the inner shaft 4 continues to rotate in the reverse rotation direction CWW in this state, the ring gear 84 is rotated in the normal rotation direction CW at this time, so that the carrier mover 6 is also moved in first direction (+) while being rotated in the normal rotation direction CW. In this case, the inner tub 2 is rotated in the normal rotation direction CW, and the pulsator 3 is rotated in the reverse rotation direction CCW. (see FIG. 10E).

Then, when the carrier mover 6 is further moved in the first direction (+) and stopped by the first stopper 37, it returns to the state of FIG. 3. Thereafter, the driving of the motor 10 is stopped, and then the motor 10 is rotated in the opposite direction, thereby repeating the above-described processes from FIG. 3 to FIG. 8.

The washing machine of the present invention has an effect of simplifying the clutch system that connects or disconnects the inner shaft and the outer shaft in comparison with the related art. Particularly, since the operation of the clutch system is performed by a motor that rotates the inner shaft, there is no need for a separate power or driving source for the operation of the clutch.

Further, since the connection and disconnection between the inner shaft and the outer shaft are achieved by controlling the rotation direction of the motor, the control of the clutch system can be accomplished very simple.

Further, by rotating the pulsator and the inner tub in opposite directions, the washing power can be improved.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A washing machine comprising an outer tub containing water, and an inner tub disposed in the outer tub to accommodate laundry and rotated about an axis, the washing machine comprising:
   a motor for providing rotational force;
   an outer shaft that has a first hollow, and rotates the inner tub;
   an inner shaft disposed in the first hollow and rotated by the motor;
   a pulsator disposed in the inner tub and coupled with the inner shaft; and
   a planetary gear train for transmitting rotational force of the motor,
   wherein the planetary gear train comprises:
      a ring gear fixed to the outer shaft;
      a sun gear connected to the inner shaft inside the ring gear;
      a plurality of pinion gears which are engaged with the sun gear and inscribed in the ring gear, and allowed to move in a direction parallel to the inner shaft; and
      a clutch carrier which rotatably supports each of the plurality of pinion gears, and is moved together with the plurality of pinion gears when the plurality of pinion gears are moved in the direction parallel to the inner shaft,
   wherein the clutch carrier is disposed to be movable in a direction in which the axis extends in the first hollow and has a cylindrical shape having a second hollow through which the inner shaft passes, and
   wherein the washing machine further comprises a carrier mover which is formed in a cylindrical shape, and has an outer circumferential surface that is spline-coupled to an inner circumferential surface of the outer shaft defining the first hollow, and an inner circumferential surface that is screwed with an outer circumferential surface of the clutch carrier.

2. The washing machine of claim 1, wherein the carrier mover is moved in a first direction when being rotated in a normal direction with respect to the clutch carrier, and is moved in a second direction opposite to the first direction when being rotated in a reverse rotation direction with respect to the clutch carrier, and
   wherein the washing machine further comprises:
      a first stopper disposed at the outer shaft and restricting movement of the carrier mover in the first direction; and
      a second stopper disposed at the outer shaft and restricting movement of the carrier mover in the second direction.

3. The washing machine of claim 2, wherein the washing machine further comprises a third stopper connected to the outer tub and restricting movement of the clutch carrier in the second direction.

4. The washing machine of claim 3, wherein the third stopper is a non-rotating member whose position with respect to the outer tub is fixed.

5. The washing machine of claim 4, wherein the third stopper restricts rotation of the clutch carrier.

6. The washing machine of claim 1, wherein the clutch carrier comprises:
   a first mounting plate having a first through hole through which the inner shaft passes and to which one end of the rotational shaft of the pinion gear is connected;
   a second mounting plate having a second through hole through which the inner shaft passes and to which the other end of the rotational shaft of the pinion gear is connected;
   a clutch portion extending in the first direction from the first mounting plate and having a tubular shape; and
   a connecting portion extending in the second direction from the second mounting plate.

7. The washing machine of claim 6, wherein an external thread is formed on the outer circumferential surface of the clutch portion, and the carrier mover is engaged with the outer circumferential surface of the clutch portion.

8. The washing machine of claim 1, wherein the inner shaft and the sun gear are coupled so that axial movement of the sun gear with respect to the inner shaft is permitted.

* * * * *